(12) United States Patent
Tata

(10) Patent No.: US 11,968,622 B2
(45) Date of Patent: *Apr. 23, 2024

(54) INTELLIGENT POWER SAVING

(71) Applicant: Nordic Semiconductor ASA, Trondheim (NO)

(72) Inventor: Chaitanya Tata, Hyderabad (IN)

(73) Assignee: Nordic Semiconductor ASA, Trondheim (NO)

( * ) Notice: Subject to any disclaimer, the term of this patent is extended or adjusted under 35 U.S.C. 154(b) by 59 days.

This patent is subject to a terminal disclaimer.

(21) Appl. No.: 17/834,609

(22) Filed: Jun. 7, 2022

(65) Prior Publication Data

US 2022/0303896 A1    Sep. 22, 2022

Related U.S. Application Data

(63) Continuation of application No. 15/368,809, filed on Dec. 5, 2016, now Pat. No. 11,627,529.

(30) Foreign Application Priority Data

Dec. 4, 2015 (GB) ..................................... 1521461

(51) Int. Cl.
*H04W 24/00* (2009.01)
*H04L 43/0894* (2022.01)
(Continued)

(52) U.S. Cl.
CPC ..... *H04W 52/0225* (2013.01); *H04L 43/0894* (2013.01); *H04L 43/10* (2013.01); *H04L 43/16* (2013.01); *H04W 24/10* (2013.01); *H04W 52/0216* (2013.01); *H04W 52/0248* (2013.01); *H04W 80/00* (2013.01); *H04W 84/12* (2013.01); *Y02D 30/70* (2020.08)

(58) Field of Classification Search
None
See application file for complete search history.

(56) References Cited

U.S. PATENT DOCUMENTS 7,660,578 B2    2/2010  Viitamäki et al.
9,813,873 B2 *  11/2017 Ben-Itzhak ....... H04M 1/72463
(Continued)

FOREIGN PATENT DOCUMENTS

EP    1 473 951 A2    11/2004

*Primary Examiner* — Willie J Daniel, Jr.
(74) *Attorney, Agent, or Firm* — Klarquist Sparkman, LLP

(57) ABSTRACT

A device comprising: a transceiver operable in a first or second mode and configured to receive packets from a remote device, each packet comprising an indication of whether or not the remote device has a further packet to transmit, wherein: in the first mode the transceiver: (i) sends a polling message in response to receiving the indication of a further packet for transmission; and (ii) listens for that further packet; and in the second mode the transceiver: (i) does not send a polling message in response to receiving the indication of a further packet for transmission; and (ii) listens for packets regardless of whether a received packet indicates that there is a further packet to transmit or not; and a controller configured to monitor an activity level for the transceiver and cause the transceiver to operate in the first or second mode in dependence on the activity level.

20 Claims, 3 Drawing Sheets

(51) Int. Cl.
*H04L 43/10* (2022.01)
*H04L 43/16* (2022.01)
*H04W 24/10* (2009.01)
*H04W 52/02* (2009.01)
H04W 80/00 (2009.01)
H04W 84/12 (2009.01)

(56) References Cited

U.S. PATENT DOCUMENTS

| | | | |
|---|---|---|---|
| 11,627,529 B2* | 4/2023 | Tata | H04L 43/16 370/252 |
| 2007/0147330 A1 | 6/2007 | Smith et al. | |
| 2007/0238438 A1 | 10/2007 | Alon et al. | |
| 2009/0046711 A1 | 2/2009 | Poikela | |
| 2014/0153434 A1 | 6/2014 | Kokovidis et al. | |

\* cited by examiner

INTELLIGENT POWER SAVING

CROSS REFERENCE TO RELATED APPLICATIONS

This is a Continuation of U.S. patent application Ser. No. 15/368,809, filed Dec. 5, 2016, which claims the benefit of Great Britain Patent Application No. 1521461.2, filed Dec. 4, 2015, both of which are hereby incorporated by reference in their entirety.

BACKGROUND OF THE INVENTION

This invention relates to devices and methods for saving power and reducing latency at a wireless transceiver.

There is a continuing need for portable, battery-powered devices to be power efficient. Wireless communication by such devices can be power-hungry, especially for communications that have high data rates and/or are over long distances. When transmitting data, a wireless communications device may power up its transmitter when it has data to send. Once that data is sent, it may power down in order to save power until it has data to send again. When transmitting data, the device knows when it needs to send data and so it is able to power up and power down the transmitter as required. This may be more power efficient than leaving the transmitter in a continually powered state, especially when data is sent intermittently. When receiving data, however, a receiver may not have any knowledge of when data is going to be transmitted to it by a remote device or if the remote device has any data to send at all. Thus a receiver may be required to listen continually or for long periods of time to ensure that it receives data when it is sent. Continuous listening can lead to a drain in power and may be inefficient, especially if there is no data to be received for long periods of time. There is, therefore, a need to provide a more efficient way of receiving data.

BRIEF SUMMARY OF THE INVENTION

According to a first aspect there is provided a device capable of communicating according to a wireless communications protocol, the device comprising: a transceiver configured to receive packets from a remote device, each packet comprising an indication of whether or not the remote device has a further packet to transmit, the transceiver being operable in a first mode or a second mode, wherein: in the first mode the transceiver is configured to: (i) send a polling message to the remote device in response to receiving the indication of the remote device having a further packet to transmit; and (ii) listen for that further packet; and in the second mode the transceiver is configured to: (i) not send a polling message to the remote device in response to receiving the indication of the remote device having a further packet to transmit; and (ii) listen for packets regardless of whether a received packet indicates that the remote device has a further packet to transmit or not; and a controller configured to monitor an activity level for the transceiver and cause the transceiver to operate in the first mode or the second mode in dependence on the monitored activity level.

The controller may be configured to monitor the activity level by measuring a rate of number of packets received over time. The controller may be configured to cause the transceiver to operate in the second mode if the measured rate is greater than 800 packets received per second.

The controller may be configured to monitor the activity level by measuring a rate of amount of data received over time. The controller may be configured to cause the transceiver to operate in the second mode if the measured rate is greater than 10 Mbits per second.

The controller may be configured to monitor the activity level by determining a priority level for data received. The controller may be configured to cause the transceiver to operate in the second mode if the priority level is associated with video and/or voice data.

The transceiver may consume less power in the first mode than in the second mode.

The transceiver may be configured to listen for packets for a greater amount of time in the second mode than in the first mode.

The transceiver may be configured to continually listen for packets in the second mode.

The transceiver may be configured to intermittently listen for packet in the first mode. The transceiver may be configured to operate in the first mode by default.

In response to operating in the second mode, the transceiver may configured to indicate to the remote device that the device is operating in the second mode.

The wireless communications protocol may be a Wi-Fi protocol. The first mode may be a power save (PS) mode and the second mode may be an active mode according to the Wi-Fi protocol. The indication of whether or not the remote device has a further packet to transmit may be dependent on a more data field of a Wi-Fi packet and wherein the polling message may be a PS-Poll. The controller may be configured to monitor the activity level by measuring a rate of receiving packets having the more data field set to indicate that the remove device has a further packet to transmit. The controller may be configured to cause the transceiver to operate in the second mode if said rate of received packets with the more data field set is greater than 10 packets per second.

The device may be embodied in hardware on an integrated circuit.

According to a second aspect there is provided a method of communicating according to a wireless communications protocol, the method comprising: receiving packets from a remote device, each packet comprising an indication of whether or not the remote device has a further packet to transmit; operating a transceiver in a first mode or a second mode, wherein: in the first mode the transceiver: (i) sends a polling message to the remote device in response to receiving the indication of the remote device having a further packet to transmit; and (ii) listens for that further packet; and in the second mode the transceiver: (i) does not send a polling message to the remote device in response to receiving the indication of the remote device having a further packet to transmit; and (ii) listens for packets regardless of whether a received packet indicates that the remote device has a further packet to transmit or not; and monitoring an activity level for the transceiver and causing the transceiver to operate in the first mode or the second mode in dependence on the monitored activity level.

The monitoring step may comprise monitoring the activity level by measuring a rate of number of packets received over time. The transceiver may be caused to operate in the second mode if the measured rate is greater than 800 packets received per second.

The monitoring step may comprise monitoring the activity level by measuring a rate of amount of data received over time. The transceiver may be caused to operate in the second mode if the measured rate is greater than 10 Mbits per second.

The monitoring step may comprise monitoring the activity level by determining a priority level for data received. The transceiver may be caused to operate in the second mode if the priority level is associated with video and/or voice data.

The transceiver may consume less power in the first mode than in the second mode.

The transceiver may listen for packets for a greater amount of time in the second mode than in the first mode.

The transceiver may continually listen for packets in the second mode. The transceiver intermittently listens for packet in the first mode.

The transceiver may operate in the first mode by default.

In response to operating in the second mode, the method may further comprise indicating to the remote device that the device is operating in the second mode.

The wireless communications protocol may be a Wi-Fi protocol. The first mode may be a power save (PS) mode and the second mode is an active mode according to the Wi-Fi protocol. The indication of whether or not the remote device has a further packet to transmit may be dependent on a more data field of a Wi-Fi packet and wherein the polling message is a PS-Poll. The monitoring step may comprise monitoring the activity level by measuring a rate of receiving packets having the more data field set to indicate that the remove device has a further packet to transmit. The transceiver may be caused to operate in the second mode if said rate of received packets with the more data field set is greater than 10 packets per second.

According to a third aspect there is provided a method of manufacturing, at an integrated circuit manufacturing system, the device described above.

According to a fourth aspect there is provided an integrated circuit definition dataset that, when processed in an integrated circuit manufacturing system, configures the system to manufacture the device described above.

According to a fifth aspect there is provided a non-transitory computer readable storage medium having stored thereon an integrated circuit definition dataset that, when processed in an integrated circuit manufacturing system, configures the system to manufacture the device described above.

According to a sixth aspect there is provided an integrated circuit manufacturing system comprising: a non-transitory computer readable storage medium having stored thereon an integrated circuit definition dataset defining the device described above;
 a layout processing system configured to process the integrated circuit definition dataset so as to generate a manufacturing definition of an integrated circuit embodying the device described above; and
 an integrated circuit generation system configured to manufacture the device according to the manufacturing definition.

According to a seventh aspect there is provided computer program code for performing the method described above.

According to an eighth aspect there is provided a non-transitory computer readable storage medium having stored thereon computer readable instructions that, when executed at a computer system, cause the computer system to perform the method described above.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

The following describes a network in which data is transmitted between wireless communication devices. That data is described herein as being transmitted in packets and/or frames and/or messages. This terminology is used for convenience and ease of description. Packets, frames and messages have different formats in different communications protocols. Some communications protocols use different terminology. Thus, it will be understood that the terms "packet" and "frame" and "messages" are used herein to denote any signal, data or message transmitted over the network.

The Wi-Fi communications protocol is commonly used for many wireless applications between computing devices, network servers and the like. The devices, methods and networks disclosed below will be described with reference to devices and networks that can operate in accordance with a IEEE 802.11 Wi-Fi communications protocol. However, the general principles described below can be applied to devices and systems operating according to other communications protocols such as Bluetooth, 3GPP, LTE, etc.

Figure 1:
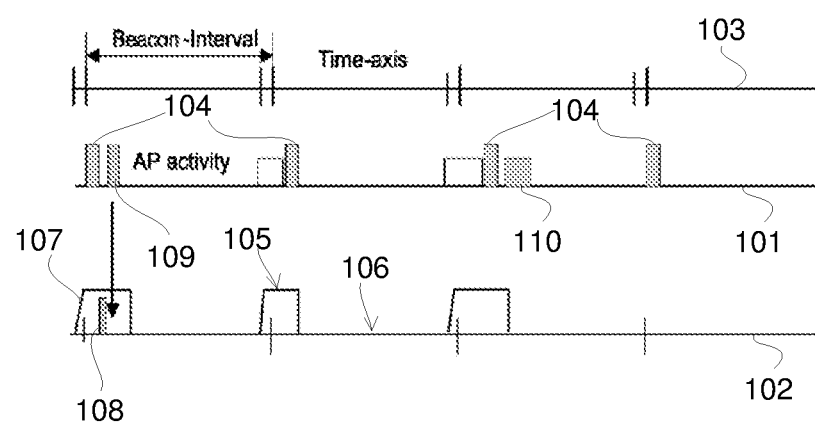
FIG. 1 shows a conventional Wi-Fi communication method.

FIG. 1 depicts a prior art Wi-Fi network with devices operating in a power saving mode. The figure illustrates the activity between an access point (AP) 101 and a station (STA) 102. The top line 103 in FIG. 1 represents the time axis.

The transceiver of STA 102 may be in one of two different power states: (i) Awake: STA transceiver is fully powered (as illustrated at 105) or (ii) Doze: STA transceiver is not able receive data and consumes very low or no power (as illustrated at 106).

The AP 101 periodically broadcasts a beacon 104, which may comprise an indication to the STA 102 of whether the AP 101 has any data to send to the STA 102. The time between each beacon broadcast is known as the beacon interval. The STA 102 may know the beacon interval and so it enters the awake state so that it can listen for the beacons from the AP 101. The transceiver power ramp-ups up from the doze state to the awake state, as indicated at 107, and receives the beacon frame 104.

In the power saving (PS) mode (which may be the default operating mode for STAs), if the beacon 104 indicates that there is a data frame buffered for that STA 102, it generates and sends a message, such as a PS-Poll frame 108, which elicits the transmission of the buffered data frame 109 from the AP 101. The indication may be provided in a traffic indication map (TIM) field in the beacon. The AP 101 transmits the single buffered data frame 109 to the STA 102 only in response to a PS-Poll from that STA 102. In the PS mode, a STA 102 will be in the doze state and enters the awake state to receive beacon frames, receive broadcast and multicast transmissions following certain received beacon frames, to transmit, and to await responses to transmitted PS-Poll frames to receive buffered data frames. When a beacon indicates that there is no data for STA 102, the STA does not send a PS-Poll message and enters the doze state. In the figure, data 110 at AP 101 is data for another STA (not shown). The beacon received by STA 102 may indicate that data 110 is for another STA and so the transceiver at STA 102 does not send a PS-Poll message and switches to the doze mode.

The data frame 109 may comprise a "More Data" field, which can be set to indicate to the STA 102 whether or not there is a further data frame buffered at the AP 101 to send to that STA 102. If the More Data field in the received data indicates that more traffic for that STA 102 is buffered, the STA 102, at its convenience, shall Poll the AP using the PS-Poll message until no more data frames are buffered for that STA 102. If the more data field indicates that there is no more data buffered for STA 102, then the STA 102 will enter the doze state.

The STA 102 may operate in an active mode instead of the PS mode. In the active mode, the STA 102 may receive frames at any time and the STA 102 is continually in the Awake state. STA 102 operating in the active mode will have its receiver powered up continuously. The STA 102 may indicate to the AP 101 which mode (PS or active) the STA 102 is operating in. This indication may be via a Power Management field in frames sent by the STA 102 to the AP 101. For example, the STA 102 may send a Null-Data/Data/QoS-Null-Data frame with a Power management bit set to 0 to indicate that the STA 102 is in active mode. When the STA 102 is operating in the active mode, the AP 101 will not buffer any data frames for that STA 102 for power management reasons. Data frames destined for STA 102 in the active mode will be directly transmitted to STA 102 without waiting for a PS-Poll to be received by the AP 101 first. Thus, the STA 102 does not need to interpret the beacon frames to determine if there is any data waiting for the STA 102 as it does not need to send PS-poll messages to cause the AP to send the data.

In the power saving mode, the STA 102 is required to send a PS-Poll message to the AP 101 per data frame that is to be received. This helps the STA 102 to save power as it will only be in the awake state if there is data to be received. However, when there is a large amount of traffic to be sent from the AP 101 to the STA 102, sending a PS-Poll frame per frame to be received can lead to high latencies and lower throughputs. Thus, in the high traffic case it may be more efficient for the STA 102 to switch from the power save mode to the active mode. In the case when there is low traffic and the STA 102 is operating the active mode, it may not be power efficient for the STA 102 to be continually listening if there is only a small amount of packets to be sent.

Figure 2:
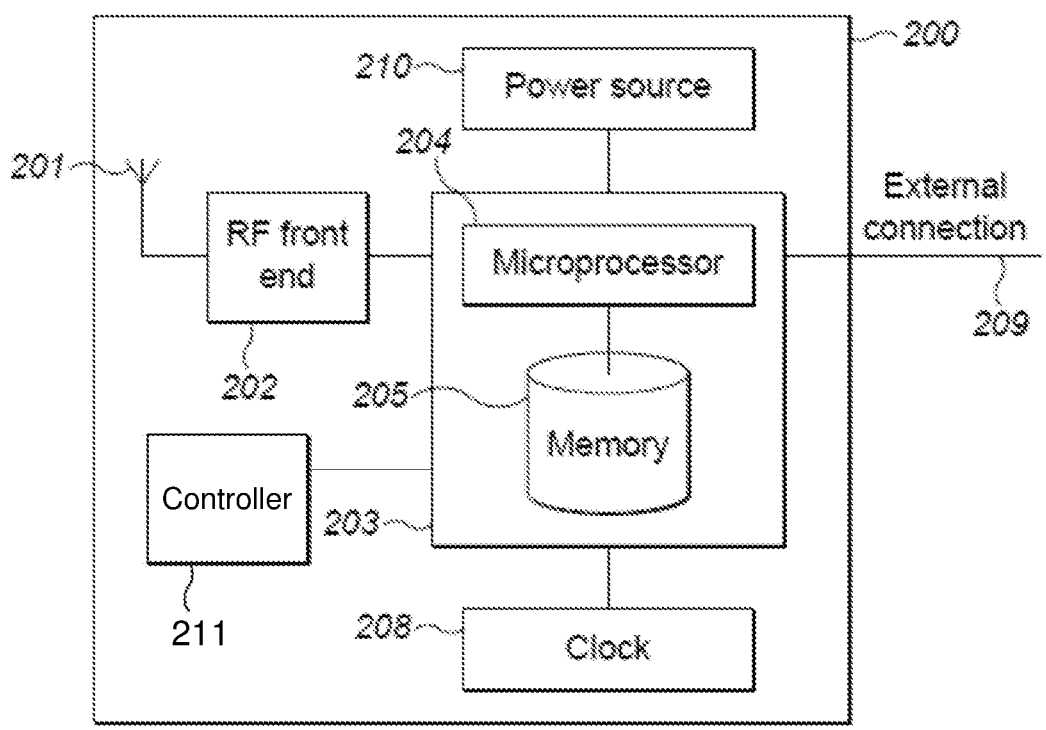
FIG. 2 shows a device capable of receiving data efficiently.

FIG. 2 depicts a device 200 which can operate as an STA and is capable of using a hybrid approach which combines the benefits of both the power save and active modes to provide an STA that has greater power efficiency, lower latency and higher throughput than conventional STAs.

The STA 200 comprises an antenna 201, a radio frequency (RF) front end 202 and a baseband processor 203. The baseband processor 203 comprises a microprocessor 204 and a non-volatile memory 205. The non-volatile memory 205 stores in non-transitory form program code that is executable by the microprocessor to cause the baseband processor to implement the communications protocol of the network and the methods described herein. The components may operate as a transmitter and receiver (i.e. a transceiver) or as a receiver only.

In order to transmit messages the processor 203 can drive the RF front end 202, which in turn causes the antenna 201 to emit suitable RF signals. Signals received at the antenna 201 (e.g. from an AP) can be pre-processed (e.g. by analogue filtering and amplification) by the RF front end 202, which presents corresponding signals to the processor 203 for decoding. The device comprises a controller 211 which may monitor received signals and control operating modes, as will be described in more detail below.

The device also comprises a clock 208, which can be turned on or off by the microprocessor 204 in order to save power, and optionally an external connection 209 suitable for exchanging information with other components (not shown) connected to or integrated with the device 200. The external connection 209 may be wired or wireless. The device also comprises a power source 210, which may be a battery. The device may also be mains-powered.

The RF front end 202 and the baseband processor 203 could be implemented on one or more integrated circuits.

In the case that the wireless communications device operates according to two or more communications protocols, it may have separate transceiver circuitry for each communications protocol, in which case the device of FIG. 2 would additionally have a further antenna, RF front end and baseband processor for each communications protocol that it supports. Alternatively, one or more of the antenna, RF front end and baseband processor may be shared by two or more of the communications protocols that the device is configured to communicate with.

Figure 3:
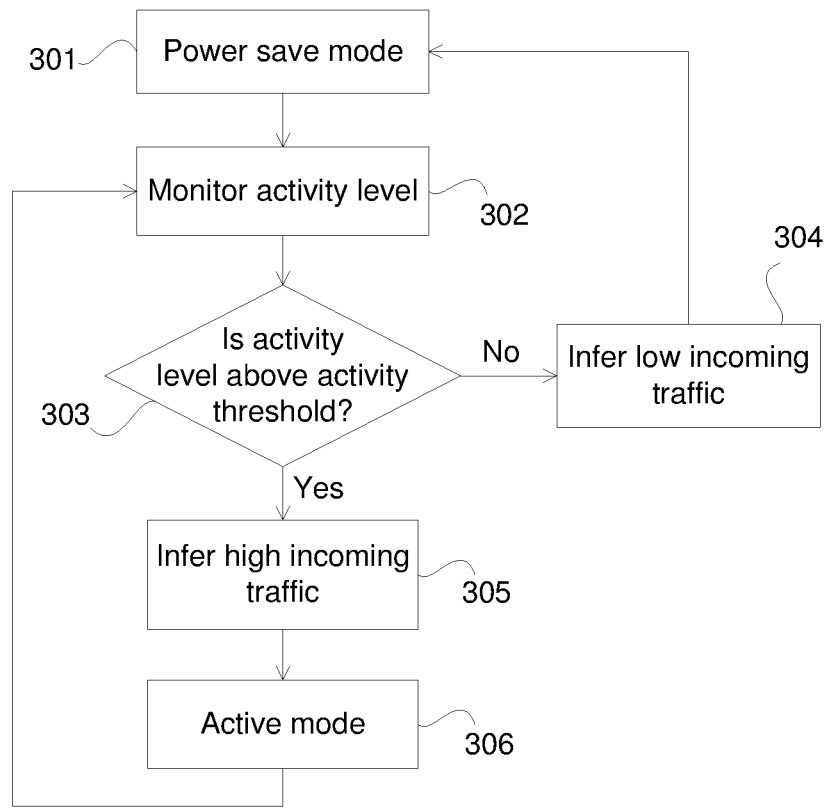
FIG. 3 shows a process for receiving data efficiently.

FIG. 3 shows a process that may be performed by device 200 (which may be an STA, for example) to implement the efficient hybrid power save and active mode method. At step 301, STA 200 is in the PS mode. This mode may be the default mode for the STA 200.

At step 302, the activity level of the STA 200 is monitored. The activity level of the STA may be determined based on one of or a combination of two or more of the following measures: (i) the number of data packets received over a period of time; (ii) the amount of data received over a period of time; (iii) the number of "more data" indications in the More Data field of received packets over a period of time; and (iv) the type or priority level of the incoming data (which may be based on, for example, the IEEE 802.11 user priority value in each received packet). Other suitable measures may be used, such as traffic characteristics from an application which is using the STA to send/receive data. The activity level is monitored to help infer the level of incoming traffic that will be coming in from the AP. If the current activity level is high, then it could be inferred that there may be more imminent incoming traffic for the STA. If the current activity level is low, then it could be inferred that there may not be much incoming traffic.

The period of time for monitoring the activity level may be dependent on which mode the STA 200 is currently operating in. Preferably, the monitoring period when the STA 200 is operating in the power save mode is smaller than the monitoring period when operating in the power save mode. One advantage of this is that it allows the STA 200 to quickly detect potentially high levels of traffic and quickly switch from the power save mode to the active mode to ensure that the high level of incoming traffic is received quickly. Having a longer monitoring period when in the active mode helps to ensure that the traffic is no longer high before switching to the power save mode. For example, the monitoring period when in the active mode may be between 400 ms and 600 ms (preferably, around 500 ms). When in the power save mode, the monitoring period may be between 200 ms to 400 ms (preferably 300 ms).

At step 303, if is determined if the monitored activity level is above or below a threshold activity level. If the monitored activity level is above the threshold, then it is inferred that there will be a high level of incoming traffic for the STA 200 (step 305). If the monitored activity level is below the threshold, then, at step 304, it is inferred that there will be a low level of incoming traffic for the STA 200. The mode is then maintained at or switched to the power saving mode, thus returning to step 301. If the mode is switched from active mode to PS mode, then the STA 200 may also inform the AP that it is entering the PS mode.

The threshold value could be fixed or variable and dependent on implementation. For example, if the number of data packets received is used to monitor activity, then the threshold could be, for example, at least 600 packets per second (preferably, at least around 800 packets per second). If the activity level is monitored using the incoming data rate, then the threshold could be, for example, at least 5 Mbits per second (preferably, around at least 10 Mbits per second). If the activity level is monitored by counting the number of times that the More Data field is set to indicate further data to send, then the threshold could be, for example, at least 5 number of packets received indicating More Data per second (preferably, at least around 10 packets indicating More Data per second). If the activity level is measured depending on the IEEE 802.11 user priority value, then the threshold could be set, for example, such that high priority traffic like voice or video causes the STA 200 to be awake and for low priority traffic like best effort or background causes the STA 200 to be in power save.

In one example, the device may switch between the active and PS modes depending on if the monitored activity level is greater than or less than the same threshold. In another example, the device may switch from PS mode to active mode if the activity level is greater than a first threshold and switch from active mode to PS mode if the activity level falls below a second, different, threshold, which is preferably lower than the first threshold. Providing a lower second threshold may help maintain low latency and avoid frequent switching between the modes compared with having a single threshold if the activity level is around that single threshold level.

The threshold value(s) could be variable. For example, the threshold value could vary in dependence on the amount of power available to the device 200 or in dependence on the power mode of the device 200 (which may be user selectable). If the power available is low or the device 200 is in a power saving mode, then the threshold may be increased such that a higher activity level is required to switch or maintain the device in the active mode. On average, this will help save more power, but at the expense of a higher latency for the incoming traffic. In another example, if the power available is high and/or the data to be received is critical, then the threshold could be lowered such that a lower activity level is required to switch or maintain the device in the active mode. On average, this will help decrease latency, but at the expense of higher power usage.

At step 305, it is inferred from the monitored traffic level being above the threshold that the level of incoming traffic to be received from the AP is likely to be a high. Thus, at step 306, the STA 200 switches to (or maintains) the active mode. If the STA 200 switches from the PS mode to the active mode, it will inform the AP that it is entering the active mode. The AP will then send the STA 200 any packets for that STA 200 without waiting for a PS-poll from the STA 200 first. Thus, the STA 200 will not be required to send PS-poll messages, which frees up the communications medium. Furthermore, in the active mode, the STA 200 does not need to interpret the TIM field in any beacons received from the AP. This helps save to processor resources. The process then returns to step 302 where the activity level continues to be monitored.

The process of FIG. 3 allows an STA to save power when it predicts that it will have light incoming traffic as well as reduce latency when it predicts that it will have heavy or important incoming traffic. Furthermore, the process provides for a more efficient use of the communications medium as, when there is heavy incoming traffic, poll messages are not required to be transmitted by the STA to the AP. STAs switching to the active mode during heavy traffic also places less of a burden on the AP as the AP will directly transmit packets without having to buffer them because it is awaiting for a PS-poll message.

The decision to switch or maintain modes of operation may also be dependent on other factors. For example, if the battery that powers the STA 200 is low, the STA may switch (or maintain) the power save mode even if it is inferred that there is a high level of incoming traffic.

The activity level could also be monitored to help infer other scenarios that may affect the operation of the STA 200. For example, in an example scenario, the STA 200 may be part of a portable device (such as a smartphone) that is travelling through multiple AP coverage areas (e.g. Wi-Fi hotspots). The STA 200 may monitor the changes in the identifiers (e.g. the SSID) of the APs over a period of time to determine if the STA 200 is stationary or travelling. If it is determined that the STA 200 is travelling, the device could switch to (or maintain) the active mode so that it receives data as quickly as possible before moving to the next hotspot.

The above process may be implemented using communications protocols other than Wi-Fi. For example, the process could be implemented on mobile networks devices such as LTE devices.

The device of FIG. 2 is shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a device configured to perform any of the methods described herein, or to manufacture a device comprising any apparatus described herein.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a device will now be described with respect to FIG. 4.

Figure 4:
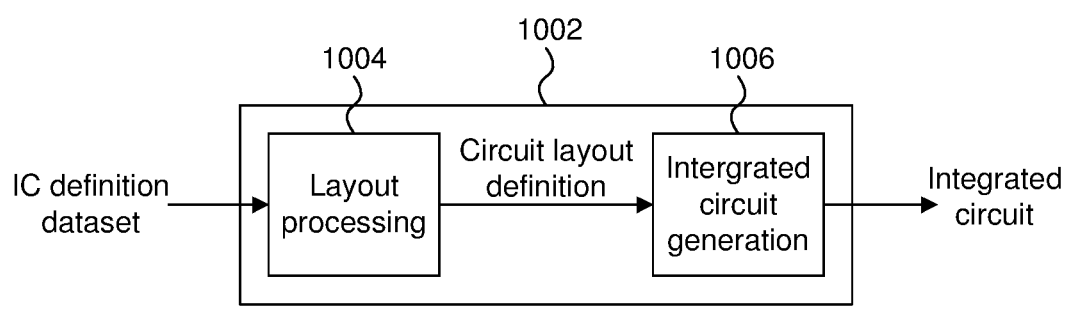
FIG. 4 is a schematic diagram of an integrated circuit manufacturing system.

FIG. 4 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a device as described in any of the examples herein), process the IC definition dataset, and generate an IC according to the IC definition dataset (e.g. which embodies a device as described in any of the examples herein). The processing of the IC definition dataset configures the IC manufacturing system 1002 to manufacture an integrated circuit embodying a device as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 4 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 4, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A device capable of communicating according to a wireless communications protocol, the device comprising:
 a transceiver configured to receive packets from a remote device, each packet comprising an indication of whether or not the remote device has a further packet to transmit, the transceiver being operable in a first mode or a second mode, wherein:
  in the first mode the transceiver is configured to: (i) send a polling message to the remote device in response to receiving the indication of the remote device having a further packet to transmit; and (ii) listen for that further packet; and
  in the second mode the transceiver is configured to: (i) not send a polling message to the remote device in response to receiving the indication of the remote device having a further packet to transmit; and (ii) listen for packets regardless of whether a received packet indicates that the remote device has a further packet to transmit or not; and
 a controller configured to:
  monitor an activity level for the transceiver by monitoring for a change in an identifier of one or more remote devices; and
  cause the transceiver to operate in the first mode or the second mode in dependence on the monitored activity level.

2. The device according to claim 1, wherein the controller is configured to monitor the activity level by monitoring for a change in an identifier received from one or more remote devices over a period of time to determine if the device is stationary or travelling.

3. The device according to claim 2, wherein the controller is configured to cause the transceiver to operate in the second mode when the device is determined to be travelling.

4. The device according to claim 1, wherein the controller is further configured to monitor the activity level by measuring a rate of number of packets received over time.

5. The device according to claim 1, wherein the controller is further configured to monitor the activity level by measuring a rate of amount of data received over time.

6. The device according to claim 1, wherein the controller is further configured to monitor the activity level by determining a priority level for data received.

7. Device according to claim 6, wherein the controller is configured to cause the transceiver to operate in the second mode if the priority level is associated with video and/or voice data.

8. The device according to claim 1, wherein the transceiver is configured to listen for packets for a greater amount of time in the second mode than in the first mode.

9. The device according to claim 1, wherein the transceiver is configured to intermittently listen for packets in the first mode and continually listen for packets in the second mode.

10. The device according to claim 1, wherein the wireless communications protocol is a Wi-Fi protocol.

11. The device according to claim 10, wherein the first mode is a power save (PS) mode and the second mode is an active mode according to the Wi-Fi protocol.

12. The device according to claim 10, wherein the indication of whether or not the remote device has a further packet to transmit is dependent on a more data field of a Wi-Fi packet and wherein the polling message is a PS-Poll.

13. The device according to claim 12, wherein the controller is further configured to monitor the activity level by measuring a rate of receiving packets having the more data field set to indicate that the remove device has a further packet to transmit.

14. The device according to claim 1, wherein the transceiver is caused to operate in the first mode or the second mode further in dependence on the power level of a battery that powers the transceiver.

15. The device according to claim 1, wherein the controller is configured to cause the transceiver to operate in the second mode in response to the monitored activity level being greater than a first threshold, and cause the transceiver to operate in the first mode in response to the monitored activity level being less than a second threshold; and,
 wherein the second threshold is different to the first threshold.

16. A method of communicating according to a wireless communications protocol, the method comprising:
 receiving packets from a remote device, each packet comprising an indication of whether or not the remote device has a further packet to transmit;
 operating a transceiver in a first mode or a second mode, wherein:
  in the first mode the transceiver: (i) sends a polling message to the remote device in response to receiving the indication of the remote device having a further packet to transmit; and (ii) listens for that further packet; and
  in the second mode the transceiver: (i) does not send a polling message to the remote device in response to receiving the indication of the remote device having a further packet to transmit; and (ii) listens for packets regardless of whether a received packet indicates that the remote device has a further packet to transmit or not;
 monitoring an activity level for the transceiver by monitoring for a change in an identifier of one or more remote devices; and
 causing the transceiver to operate in the first mode or the second mode in dependence on the monitored activity level.

17. The method according to claim 16, wherein the monitoring of the activity level comprises monitoring for a change in an identifier received from one or more remote devices over a period of time to determine if the transceiver is stationary or travelling.

18. The method according to claim 17, further comprising causing the transceiver to operate in the second mode when the transceiver is determined to be travelling.

19. The method according to claim 16, further comprising causing the transceiver to operate in the second mode in response to the monitored activity level being greater than a first threshold, and causing the transceiver to operate in the first mode in response to the monitored activity level being less than a second threshold; and, wherein the second threshold is different to the first threshold.

20. A non-transitory computer readable storage medium having stored thereon computer readable instructions that, when executed at a computer system, cause the computer system to perform a method of communicating according to a wireless communications protocol, the method comprising:

receiving packets from a remote device, each packet comprising an indication of whether or not the remote device has a further packet to transmit;

operating a transceiver in a first mode or a second mode, wherein:
in the first mode the transceiver: (i) sends a polling message to the remote device in response to receiving the indication of the remote device having a further packet to transmit; and (ii) listens for that further packet; and
in the second mode the transceiver: (i) does not send a polling message to the remote device in response to receiving the indication of the remote device having a further packet to transmit; and (ii) listens for packets regardless of whether a received packet indicates that the remote device has a further packet to transmit or not;

monitoring an activity level for the transceiver by monitoring for a change in an identifier of one or more remote devices; and causing the transceiver to operate in the first mode or the second mode in dependence on the monitored activity level.

* * * * *